(12) United States Patent
Kim

(10) Patent No.: US 7,160,112 B2
(45) Date of Patent: Jan. 9, 2007

(54) SYSTEM AND METHOD FOR LANGUAGE EDUCATION USING MEANING UNIT AND RELATIONAL QUESTION

(75) Inventor: Jang-Soo Kim, Seoul (KR)

(73) Assignee: GNB Co., Ltd., Seoul (KR)

( * ) Notice: Subject to any disclaimer, the term of this patent is extended or adjusted under 35 U.S.C. 154(b) by 427 days.

(21) Appl. No.: 10/316,637

(22) Filed: Dec. 11, 2002

(65) Prior Publication Data

US 2003/0129571 A1    Jul. 10, 2003

(30) Foreign Application Priority Data

Dec. 12, 2001  (KR) .................... 10-2001-0078699
Jul. 24, 2002   (KR) .................... 10-2002-0043623

(51) Int. Cl.
   *G09B 19/00*     (2006.01)
(52) U.S. Cl. .................. 434/156; 434/157; 434/178; 434/180
(58) Field of Classification Search ............. 434/156, 434/157, 178, 180
   See application file for complete search history.

(56) References Cited

U.S. PATENT DOCUMENTS

| | | | | |
|---|---|---|---|---|
| 4,445,187 A | * | 4/1984 | Best ......................... | 463/31 |
| 5,145,375 A | * | 9/1992 | Rubio ....................... | 434/157 |
| 5,697,789 A | * | 12/1997 | Sameth et al. ............. | 434/157 |
| 5,735,693 A | * | 4/1998 | Groiss ....................... | 434/157 |
| 5,810,598 A | * | 9/1998 | Wakamoto ................. | 434/156 |
| 5,810,599 A | * | 9/1998 | Bishop ...................... | 434/157 |
| 5,893,717 A | * | 4/1999 | Kirsch et al. .............. | 434/118 |
| 6,234,802 B1 | * | 5/2001 | Pella et al. ................. | 434/156 |
| 6,283,760 B1 | * | 9/2001 | Wakamoto ................. | 434/156 |
| 6,305,942 B1 | * | 10/2001 | Block et al. ................ | 434/156 |
| 6,358,053 B1 | * | 3/2002 | Rosenfield et al. ........ | 434/156 |
| 2002/0115044 A1 | * | 8/2002 | Shpiro ....................... | 434/156 |

* cited by examiner

*Primary Examiner*—Chanda L. Harris
(74) *Attorney, Agent, or Firm*—Baker Botts L.L.P.

(57) ABSTRACT

Disclosed herein is a system and method for language education using a meaning unit and a relational question. The system for language education includes an information provider apparatus and a subscriber apparatus. The information provider apparatus stores sentences in a form of text data with each sentence divided into meaning units, stores relational questions in a form of text data to connect the meaning units to each other, and transmits the stored meaning unit text data and the stored relational question text data in learning order via a network. The subscriber apparatus receives and outputs the meaning unit text data and the relational question text data transmitted from the information provider apparatus, and transmits text data input by a subscriber to the information provider apparatus.

15 Claims, 18 Drawing Sheets

FIG. 5A

| learning material code | moving picture data | learning procedure program | |

FIG. 5B

| learning material code | actor code | caption code | first meaning unit text | first translated meaning unit text | first relational question text | ... | i-th meaning unit text |

| i-th translated meaning unit text | i-th relational question text | ... | n-th meaning unit text | ... | |

FIG. 5C

| member code | name | address | password | current learning material code | current caption code |

| learning level | learning result | |

FIG. 5D

| member code | learning material code | basic learning score | speaking score | dictation score | |

SYSTEM AND METHOD FOR LANGUAGE EDUCATION USING MEANING UNIT AND RELATIONAL QUESTION

RELATED APPLICATIONS

This application claims priority to Korean Application No. 10-2001-0078699 filed Dec. 12, 2001, and Korean Application No. 10-2002-0043623 Filed Jul. 24, 2002.

BACKGROUND OF THE INVENTION

1. Field of the Invention

The present invention relates generally to a system for language education, and more particularly to a system and method for language education, which can provide learning materials using the Internet and multimedia so as to allow learners to effectively learn listening, speaking, reading and writing according to the levels of the learners.

2. Description of the Prior Art

Recently, as super-high speed Internet service is provided to common subscribers, the subscribers easily access various contents such as real-time moving pictures.

Services provided via the Internet include various services, including electronic commerce, Internet education, etc. Of the services, Internet education provides various education contents according to curriculums.

However, such Internet education is problematic in that effective learning is not provided because the Internet education employs a conventional learning method as it is. That is, the conventional Internet education scheme is advantageous in that learning materials are provided to learners in a multimedia manner, but is disadvantageous in that services based on an effective learning method are not provided. In the meantime, there is used another education scheme in which multimedia learning materials are stored in a Compact Disk (CD) or Digital Versatile Disk (DVD) and provided to a learner and the learner actively learns using the multimedia learning materials stored in the CD or DVD. However, while this education method can provide an enormous number of multimedia learning materials, it does not provide an effective learning method that allows learners to learn effectively.

English language learning may be divided into the learning of listening, speaking, reading and writing. Accordingly, in order to effectively learn English, the listening, speaking, reading and writing of English language must be effectively learned.

In a conventional English language learning method, a learner is made to repeatedly watch the moving pictures of conversation scenes based on various situations, which cannot produce desired learning effects. Additionally, the conventional English language learning method provides various sentences to a learner, so the learner cannot recognize the component units of a sentence. Accordingly, the learner must memorize an entire sentence, and therefore he cannot compose a sentence appropriate for a particular situation.

SUMMARY OF THE INVENTION

Accordingly, the present invention has been made keeping in mind the above problems occurring in the prior art, and an object of the present invention is to provide a system for language education using a meaning unit and a relational question, in which each sentence is provided by the meaning units in sequence and a learning process is advanced by a learner's response to a question.

Another object of the present invention is to provide a method for language education using a meaning unit and a relational question, in which each sentence is provided by the meaning units in sequence so as to allow a learner to perform listening, speaking, reading and writing learning, and the process of the learning is advanced by a learner's response to a question.

In order to accomplish the above object, the present invention provides a system for language education, comprising an information provider apparatus for storing sentences in a form of text data with each sentence divided into meaning units, storing relational questions in a form of text data to each connect the meaning units to each other, and transmitting the stored meaning unit text data and the stored relational question text data in learning order via a network; and a subscriber apparatus for receiving and outputting the meaning unit text data and the relational question text data transmitted from the information provider apparatus, and transmitting text data input by a subscriber to the information provider apparatus.

In addition, the present invention provides a method for language education, in which a language learning program is provided from a learning provider server to subscriber terminals via a network, comprising the steps of storing each sentence while being divided into a plurality of meaning units and relational questions in sentence order on a basis of levels of subscribers; receiving information on a learning stage of a subscriber and a learning mode from a subscriber terminal that is accessing the learning provider server via the network; extracting a learning material corresponding to the received information on the learning stage of the subscriber; and controlling output so that the extracted learning material is output to the subscriber terminal according to the received learning mode.

In addition, the present invention provides a method for language education using a meaning unit and a relational question, wherein data are extracted from a storage medium storing multimedia moving picture learning materials and are output to subscriber terminals in accordance with a procedure of a language learning program, comprising the steps of extracting a moving picture learning material and meaning unit data from the storage medium and receiving an item of a learning menu selected by the subscriber; and playing the extracted multimedia moving picture learning material in accordance with the selected menu item and performing learning on a basis of the meaning unit data corresponding to the played moving picture learning data.

BRIEF DESCRIPTION OF THE DRAWINGS

The above and other objects, features and advantages of the present invention will be more clearly understood from the following detailed description taken in conjunction with the accompanying drawings, in which:

FIGS. 5A to 5D are diagrams illustrating data structures of learning material and member DBs of FIGS. 1 and 3;

DESCRIPTION OF THE PREFERRED EMBODIMENTS

Figure 1:
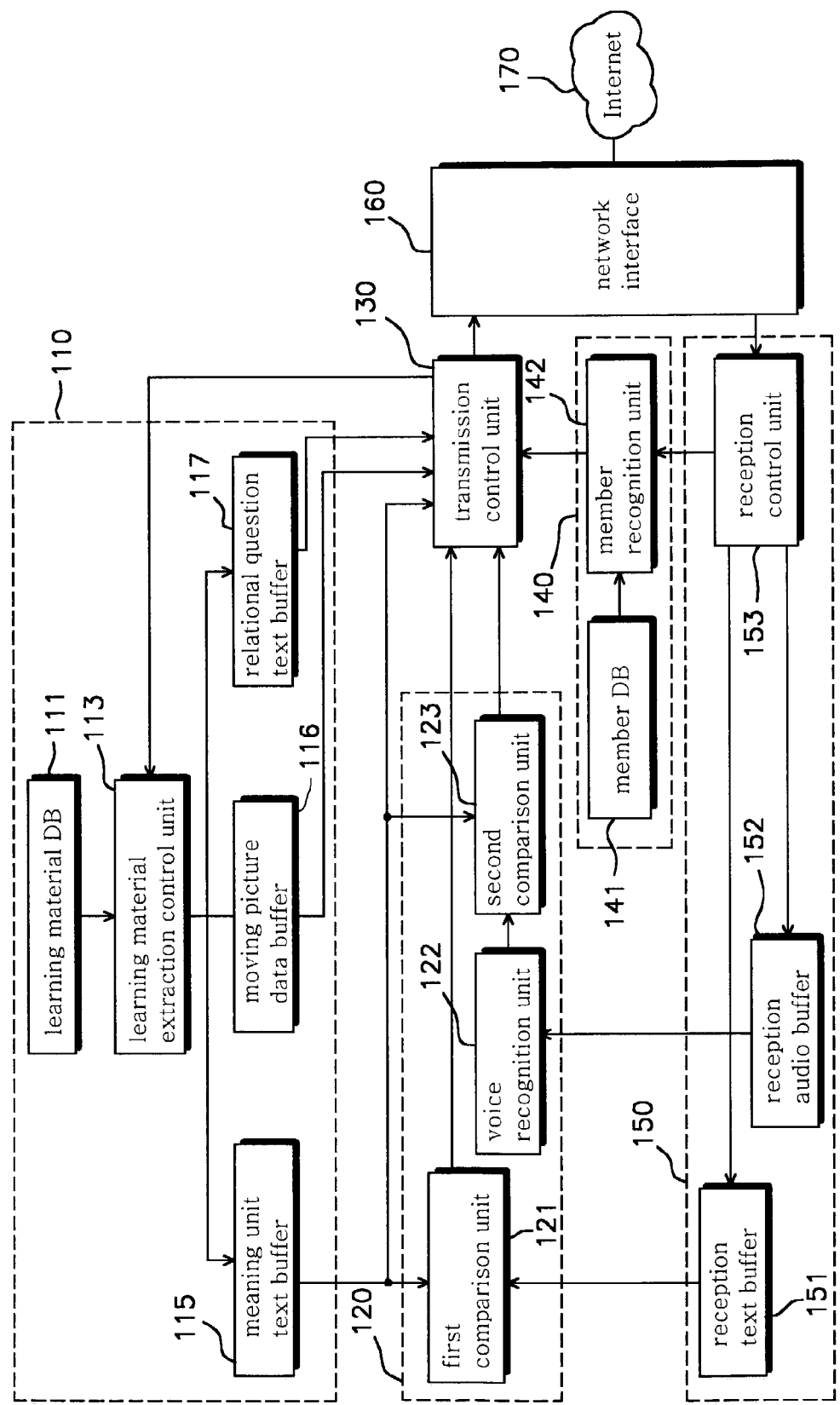
FIG. 1 is a block diagram showing a construction of an information provider apparatus of a system for language education in accordance with an embodiment of the present invention.

Reference now should be made to the drawings, in which the same reference numerals are used throughout the different drawings to designate the same or similar components.

Figure 2:
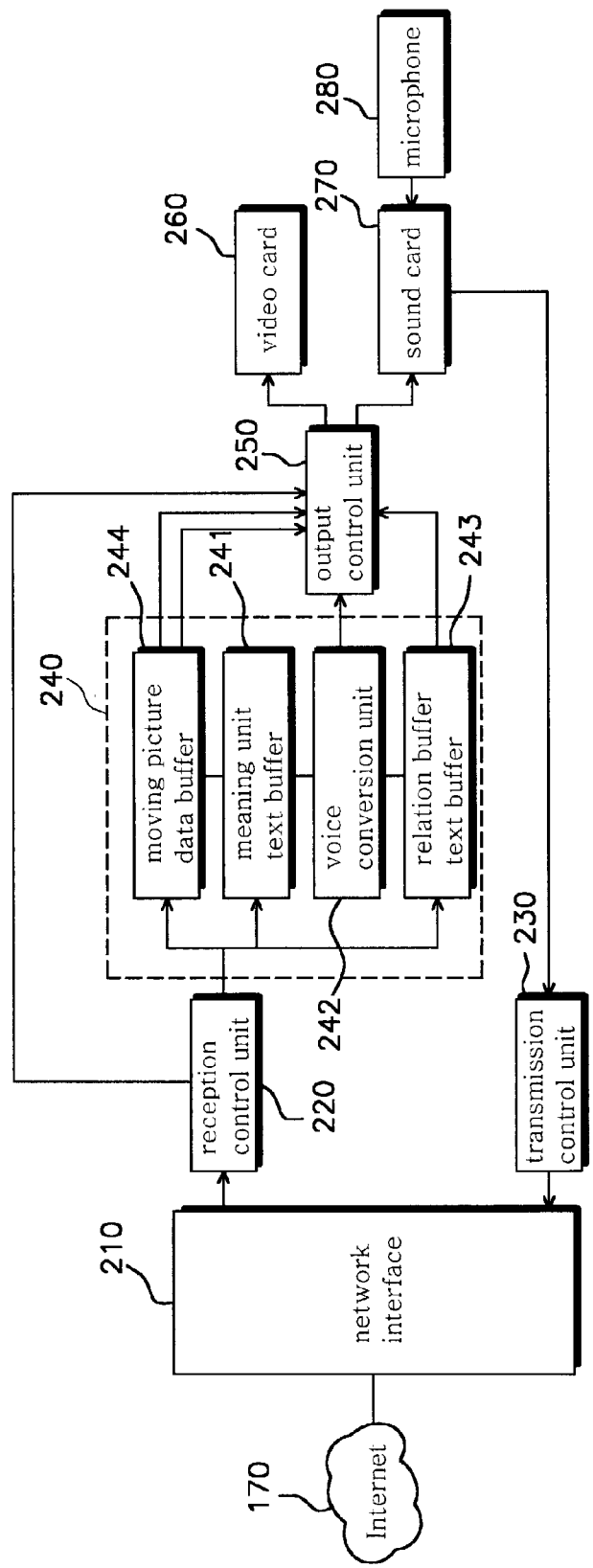
FIG. 2 is a block diagram showing a construction of a subscriber apparatus of the system for language education in accordance with the embodiment of the present invention.

FIGS. 1 and 2 show an embodiment of the present invention, in which an education process is controlled by an information provider apparatus.

FIG. 1 is a block diagram showing a construction of an information provider apparatus of a system for language education using the Internet and multimedia in accordance with the embodiment of the present invention. In this drawing, reference numerals 110, 120, 130, 140, 150 and 160 designate a learning material storage, a recognition unit, a transmission control unit, a member management unit, a reception material storage, and a network interface, respectively. Reference numerals 111, 113, 115, 116 and 117 designate a learning material DataBase (DB), a learning material extraction control unit, a meaning unit text buffer, a moving picture data buffer, and a relational question buffer, respectively. Reference numerals 121, 122, 123, 141, 142, 151, 152 and 153 designate a first comparison unit, a voice recognition unit, a second comparison unit, a member DB, a member recognition unit, a reception text buffer, a reception audio buffer and a reception control unit, respectively.

First, with reference to the drawing, the learning material storage 110 is described in detail. All learning materials are stored in the learning material DB 111. The learning material DB 111 may be comprised of a SQL server.

Learning materials stored in the learning material DB 111 are extracted therefrom under the control of the learning material extraction control unit 113, and stored in the buffers according to the kinds of contents. That is, meaning unit text from the learning material DB 111 is stored in the meaning unit text buffer 115, and the relational question text is stored in the relational question text buffer 117, respectively.

In this invention, the meaning unit refers to a collection of words that form a meaning constituting part of a sentence. For example, a sentence "I went to Kimpo airport to see my American friend" may be divided into four meaning units "I went", "to Kimpo airport", "to see" and "my American friend". Examining the sequence of the meaning units, it is seen that the meaning unit "to Kimpo airport" is next to the meaning unit "I went". Meanwhile, the meaning unit "I went" is a meaning unit that represents a location. Accordingly, in order to elicit an answer "to Kimpo airport" from a learner, a question "where to" should be asked after the presentation of the meaning unit "I went". The question "where to" is referred to as a relational question that intends to elicit a meaning unit representing a location. As a result, for the above-described example, three relational questions can be constructed.

Although in the above-described embodiment a single meaning unit is constructed as being connected to a single relational question, a plurality of meaning units could be connected to a single relational question.

In this case, the meaning unit buffer stores "n" meaning units. The learning material extraction control unit 113 selects learning materials to be extracted in response to a control signal output from the transmission control unit 130.

Data stored in the meaning unit text buffer 115 and the relational question text buffer 117 are input to the transmission control unit 130. The data input to the transmission control unit 130 is transmitted to the Internet 170 via the network interface 160.

In the meantime, data from the Internet 170 are input to the reception control unit 153 via the network interface 160. Then, the reception control unit 153 outputs the received data to the member recognition unit 142 if the received data are member information, to the reception audio buffer if the received data are audio data, and to the reception text buffer 151 if the received data are text data.

The member recognition unit 142 recognizes a member by comparing member information stored in the member DB 141 with member information output from the reception control unit 153.

The first comparison unit 121 of the recognition unit 120 determines whether the dictation of a subscriber is correct by comparing the text of the meaning unit text buffer 115 with the text of the reception text buffer 151, and outputs the result of this determination to the transmission control unit 130. In a similar manner, the second comparison unit 123 of the recognition unit 120 determines whether the pronunciation of a subscriber is correct by comparing the meaning unit text of the meaning unit text buffer 115 with text recognized by the voice recognition unit 122, and outputs the result of this determination to the transmission control unit 130.

FIG. 2 is a block diagram showing a construction of a subscriber apparatus of the system for language education using the Internet and multimedia in accordance with the embodiment of the present invention. Reference numerals 210, 220, 230, 240, 250, 260, 270 and 280 designate a network interface, a reception control unit, a transmission control unit, a learning material storage buffer, an output control unit, a video card, a sound card and a microphone, respectively. Additionally, reference numerals 241, 242, 243 and 244 designate a meaning unit text buffer, a voice conversion unit, a relational question text buffer and a moving picture data buffer, respectively.

Data from the information provider apparatus are received to the reception control unit 220 via network interface 210.

In that case, the reception control unit 220 classifies received data into meaning unit text data and relational question text data, and stores the meaning unit text data in the meaning unit text buffer 241 and the relational question text data in the relational question text buffer 243.

The text data stored in the meaning unit text buffer 241 and the relational question text buffer 243 are output to a monitor via the video card 260 under the control of the output control unit 250. Meanwhile, meaning unit or relational question audio data formed by the voice conversion unit 432 are output to a speaker via the sound card 270 under the control of the output control unit 250.

In the meantime, a voice signal from a subscriber is input to the sound card 270 via the microphone 280. The voice signal input to the sound card 270 is converted into audio data, and transmitted under the control of the transmission control unit 230. The audio data thus transmitted are received to the information provider apparatus via the Internet.

Although in the embodiment shown in FIGS. 1 and 2 learning materials have been described as being transmitted between the information provider apparatus and the subscriber apparatus via the Internet in real time as an example, learning materials provided by the information provider apparatus are stored in a portable storage device (for example, a CD, a DVD and the like), are provided to the subscriber apparatus in a lump, and are utilized. In this case, the subscriber apparatus may be comprised of any apparatus, for example, a personal computer, that can drive the portable storage device. In a similar manner, a learner may perform learning by downloading learning materials from an information provider apparatus via a subscriber apparatus in a lump and utilizing the learning materials. Therefore, the language education system according to the embodiment of the present invention enables language education both on-line and off-line.

Figure 3:
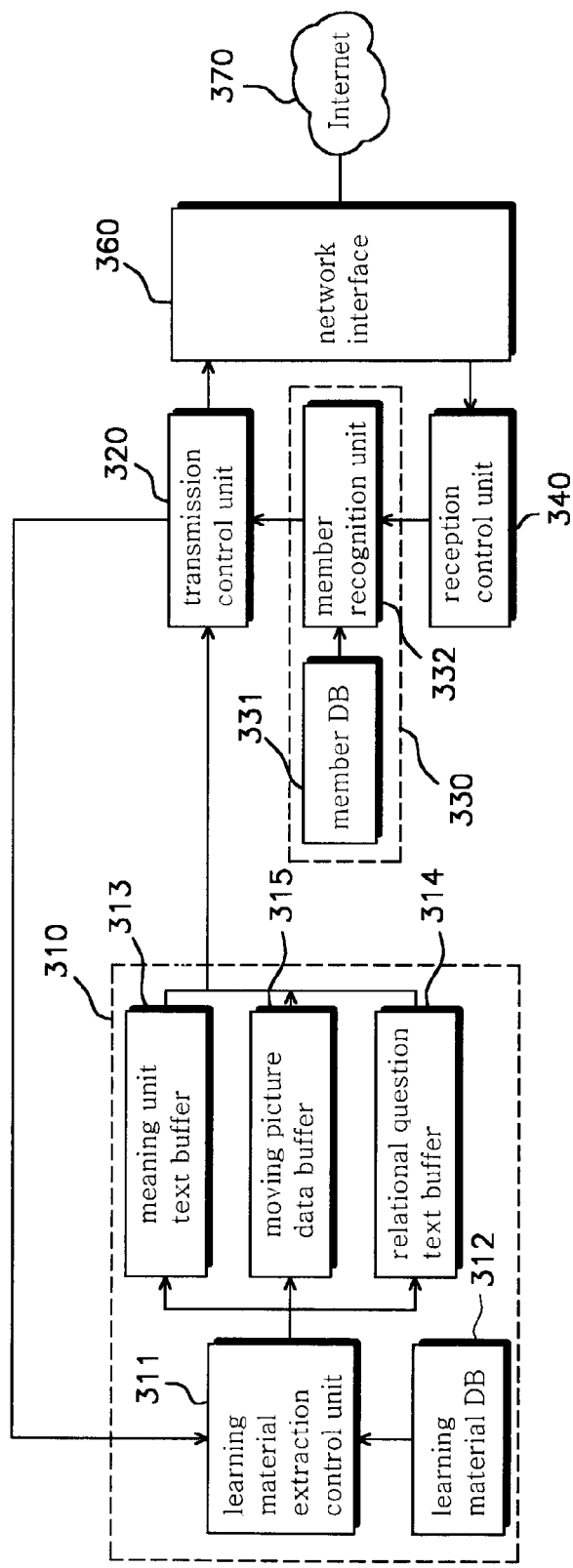
FIG. 3 is a block diagram showing a construction of an information provider apparatus in accordance with another embodiment of the present invention.
Figure 4:
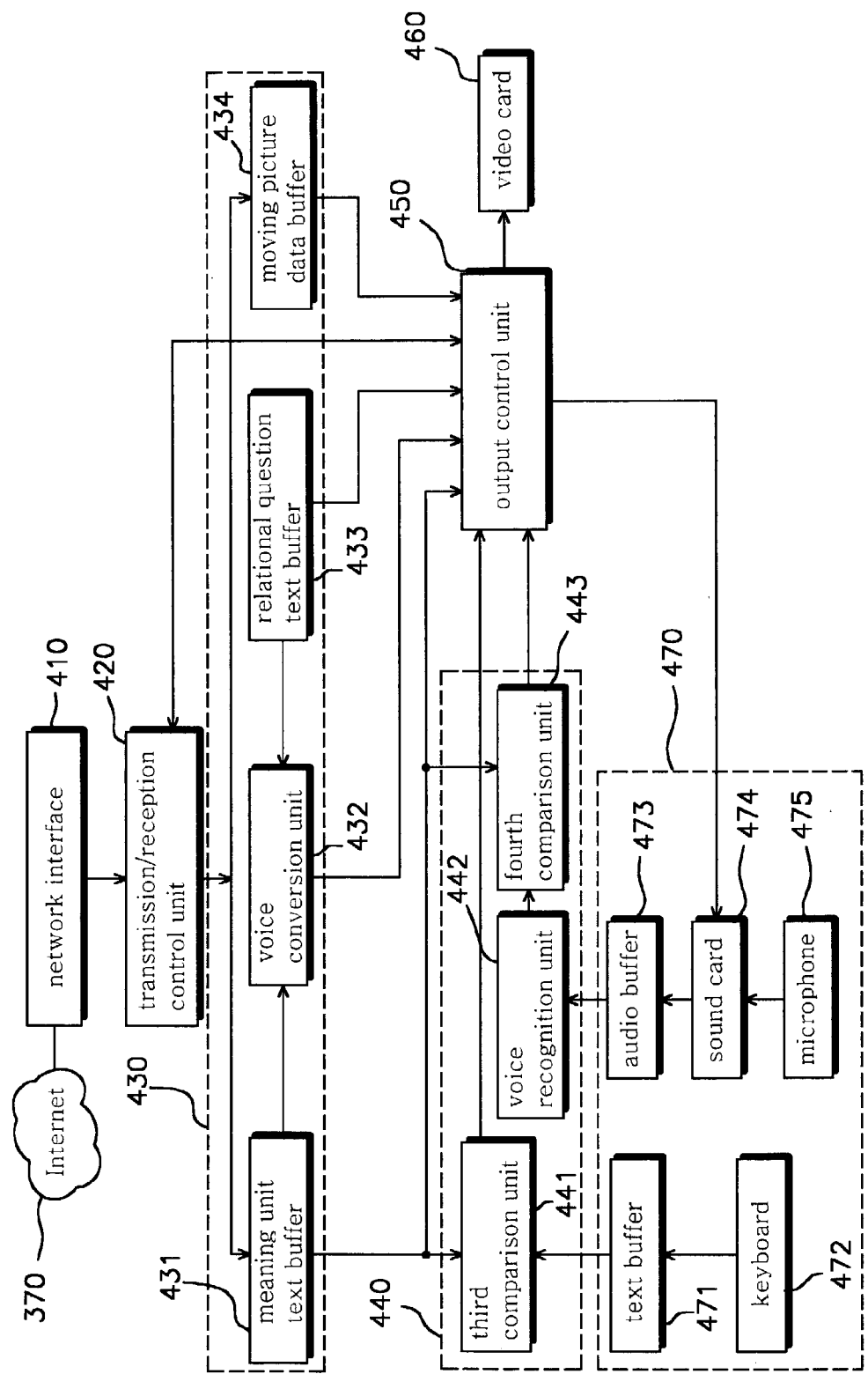
FIG. 4 is a block diagram showing a construction of a subscriber apparatus of the system for language education in accordance with another embodiment of the present invention.

FIGS. 3 and 4 show another embodiment of the present invention, in which an education process is controlled by a subscriber apparatus.

FIG. 3 is a block diagram showing a construction of an information provider apparatus of the system for language education using the Internet and multimedia in accordance with the second embodiment of the present invention. In this drawing, reference numerals 310, 320, 330, 340, 360 and 370 designate a learning material storage, a transmission control unit, a member management unit, a reception control unit, a network interface, and the Internet, respectively. Reference numerals 311, 312, 313, 314 and 315 designate a learning material extraction control unit, a learning material DB, a meaning unit text buffer, a relational question buffer and a moving picture data buffer, respectively. Reference numerals 331 and 332 designate a member DB and a member recognition unit, respectively.

First, with reference to the drawing, the learning material storage 310 is described in detail. All learning materials are stored in the learning material DB 312. The learning material DB 312 may be comprised of a SQL server.

Learning materials stored in the learning material DB 312 are extracted therefrom under the control of the learning material extraction control unit 311, and stored in the buffers according to the kinds of contents. That is, meaning unit text from the learning material DB 312 is stored in the meaning unit text buffer 313, and the relational question text is stored in the relational question text buffer 314, respectively.

In this case, the meaning unit buffer stores "n" meaning units. The learning material extraction control unit 311 selects learning materials to be extracted in response to a control signal output from the transmission control unit 320.

Data stored in the meaning unit text buffer 313 and the relational question text buffer 314 are input to the transmission control unit 320. The data input to the transmission control unit 320 is transmitted to the Internet 370 via the network interface 360.

In the meantime, data from the Internet 170 are input to the reception control unit 340 via the network interface 360. Then, the reception control unit 340 outputs the received data to the member recognition unit 332 if the received data are member information. The member recognition unit 332 recognizes a member by comparing member information stored in the member DB 331 with member information output from the reception control unit 340.

FIG. 4 is a block diagram showing a construction of a subscriber apparatus of the system for language education using the Internet and multimedia in accordance with the second embodiment of the present invention. Reference numerals 410, 420, 430, 440, 450, 460 and 470 designate a network interface, a transmission/reception control unit, a learning material storage buffer, a recognition unit, an output control unit, a video card and an input unit, respectively. Additionally, reference numerals 471, 472, 473, 474 and 475 designate a text buffer, a keyboard, an audio buffer, a sound card and a microphone, respectively.

Data from the information provider apparatus are received to the reception control unit 420 via the network interface 410. In this case, the transmission/reception control unit 420 classifies the received data into meaning unit text data and relational question text data, and stores the meaning unit text data in a meaning unit text buffer 431 and the relational question text data in a relational question text buffer 433.

The text data stored in the meaning unit text buffer 431 and the relational question text buffer 433 are output to a monitor via the video card 460 under the control of the output control unit 450. Meanwhile, meaning unit or relational question audio data formed by the voice conversion unit 432 are output to a speaker via the sound card 474 under the control of the output control unit 450.

Text data input via the keyboard 472 are input to the text buffer 471, and audio data input via the sound card 474 are stored in the audio buffer 473.

Meanwhile, a third comparison unit 441 of the recognition unit 440 determines whether the dictation of a subscriber is correct by comparing the text of the meaning unit text buffer 431 with the text of the reception text buffer 471, and outputs the result of this determination to the output control unit 450. In a similar manner, the second comparison unit 123 of the recognition unit 440 determines whether the pronunciation of a subscriber is correct by comparing the meaning unit text of the meaning unit text buffer 431 with text recognized by the voice recognition unit 442, and outputs the result of this determination to the output control unit 450.

Although in the embodiment shown in FIGS. 3 and 4 learning materials have been described as being transmitted between the information provider apparatus and the subscriber apparatus via the Internet in real time as an example, learning materials provided by the information provider apparatus are stored in a portable storage device (for example, a CD, a DVD and the like), and provided to the subscriber apparatus in a lump to be utilized. In this case, the subscriber apparatus may be comprised of any apparatus, for example, a personal computer, that can drive the portable storage device. In a similar manner, a learner may download learning materials from an information provider apparatus via a subscriber apparatus in a lump and utilize the learning materials. Therefore, the language education system according to the embodiment of the present invention enables language education both on-line and off-line.

FIGS. 5A to 5D are diagrams illustrating data structures of the learning material DB and the member DB shown in FIGS. 1 and 3 in detail.

In these drawings, FIG. 5A shows a data structure of the multimedia DB, FIG. 5B shows a data structure of the learning material DB, FIG. 5C shows a master file of the member DB, and FIG. 5D shows a record file of the member DB.

First, the multimedia DB (refer to FIG. 5A) is comprised of learning material code, moving picture data, and learning procedure program fields. The learning material DB (refer to FIG. 5B) is comprised of learning material code, actor code, caption code, meaning unit text, translated meaning unit text, and relational question text fields. A meaning unit text field and a relational question field form a single set. The learning material DB includes sets of a number that corresponds to the number of meaning units, for example, n sets. Each set is defined as a relational question set in this specification. The translated meaning unit text field is a field in which translated data of a meaning unit text are stored. The n-th one of relational question sets is constructed not to include the relational question text field because it has not next relational question.

In addition, the master file of the member DB (refer to FIG. 5C) is comprised of member code, name, address, password, current learning material code, current caption code, learning level and learning result fields. In the current learning material code field, a learning material code with which a member learns is stored. In the current caption code, a caption code of a line that a member most recently learned is stored.

Finally, the record file of the member DB (refer to FIG. 5D) is comprised of member code, learning material code, basic learning score, speaking score and dictation score fields. Accordingly, in the member dB, a basic learning score, a speaking score and a dictation score are recorded for each of the learning materials of each member. The record file of the member DB and the master file of the member DB are related to the member code at the ratio of one or more to one, respectively.

Figure 6:
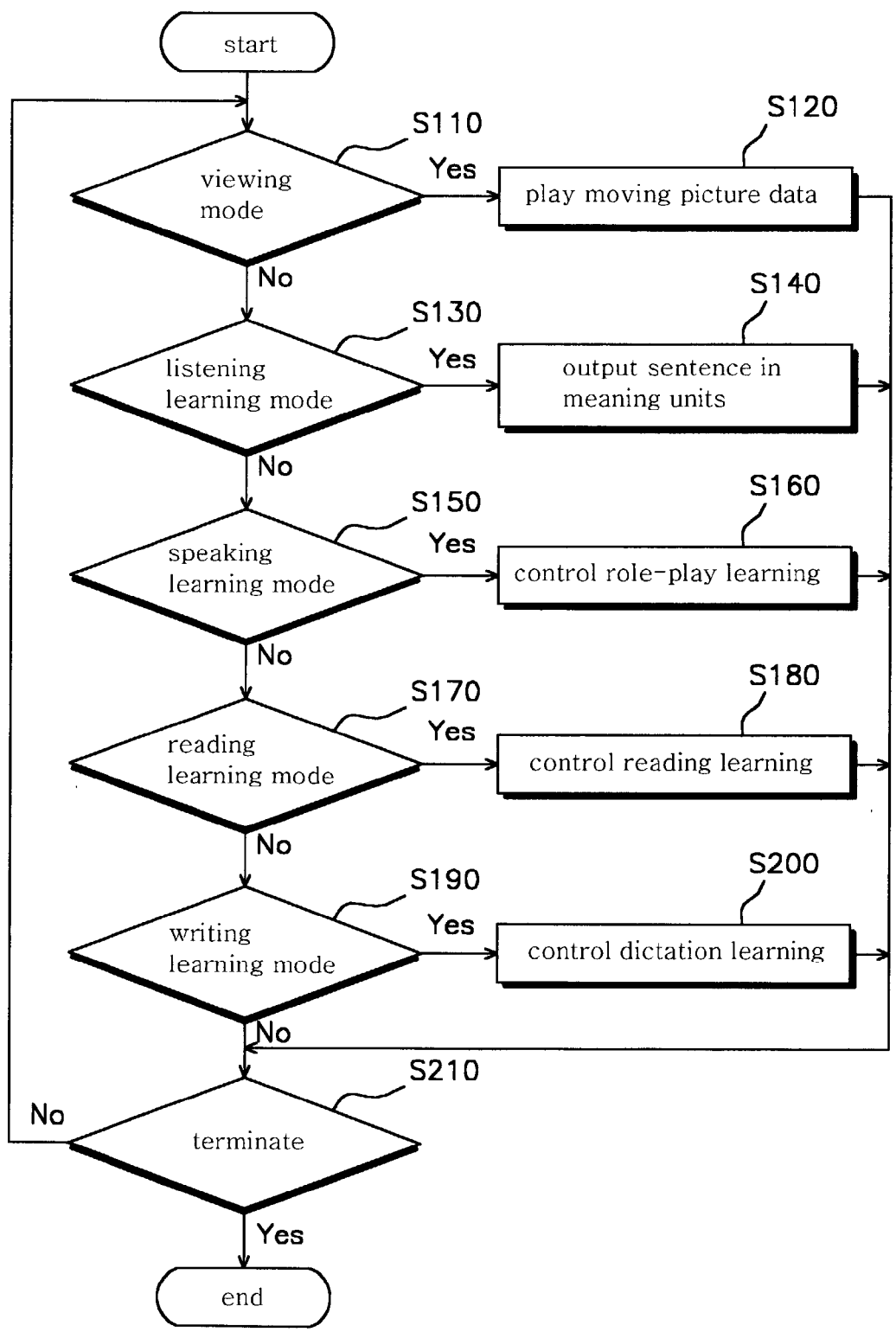
FIG. 6 is a flowchart showing an operation of the system for language education using the meaning unit and the relational question in accordance with the embodiment of the present invention.

FIG. 6 is a flowchart showing an operation of the system for language education using a meaning unit and a relational question.

The operation of the system is controlled by the transmission control unit 130 shown in FIG. 1 and the output control unit 250 shown in FIG. 2. The transmission control unit 130 or output control unit 250 controls a learning process on the basis of a learning procedure program stored in the learning material DB 111 to correspond to a learning material. For ease of description, an example in which the learning procedure program is loaded in the output control unit 250 and executed is described below.

First, the output control unit 250 determines whether a learner has selected a viewing mode at step S110. If the learner has selected the viewing mode, the output control unit 250 extracts moving picture data from the moving picture data buffer 244 and plays the moving picture data at step S120. Thus, the learner can watch moving pictures related to learning.

Thereafter, the output control unit 250 determines whether the learner has selected a listening learning mode at step S130. In the listening learning mode, the learner can listen to a sentence of a certain line by the meaning units or repeatedly listen to an entire sentence while viewing moving pictures. If the learner has selected the listening learning mode, the output control unit 250 outputs a corresponding sentence by the meaning units in sequence.

Meanwhile, if the learner has selected a speaking learning mode at step S150, the output control unit 250 allows the learner to perform role-play learning. That is, the speaking learning mode allows the learner to select one of the actors of the moving pictures and speak the lines of the actor. Accordingly, if the learner has selected the speaking learning mode, the output control unit 250 starts to control the role-play learning at step S160.

Thereafter, if the learner has selected a reading learning mode at step S170, the output control unit 250 allows the learner to perform reading learning. That is, the reading learning mode allows the learner to output a sentence corresponding to a moving picture by the meaning units and allow the learner to pronounce the sentence. In the reading learning mode, the learner can use a meaning unit and a relational question to improve his ability to utilize language.

Finally, if the learner has selected a writing learning mode at step S190, the output control unit 250 allows the learner to perform dictation learning. That is, the writing learning mode allows the learner to input a sentence corresponding to a moving picture via a keyboard or selectively input words. In the writing learning mode, the learner can perform writing learning with respect to a meaning unit constituting part of a sentence or an entire sentence.

Figure 7:
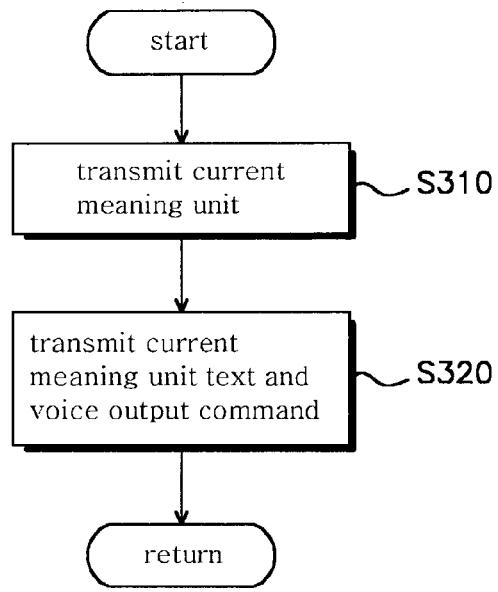
FIG. 7 is a flowchart showing an example in which the step of outputting the sentence in meaning units shown in FIG. 6 is performed in a basic learning manner.

FIG. 7 is a flowchart showing an example in which the step of outputting the sentence in meaning units shown in FIG. 6 is performed in a basic learning manner.

As illustrated in this drawing, in the basic learning manner, the transmission control unit 130 or 320 transmits a current meaning unit text at step S310, and transmits a current meaning unit text and voice output command at step S320.

That is, when a pointer of a current meaning unit value is i, the transmission control unit 130 or 320 outputs an i-th meaning unit text.

Figure 8:
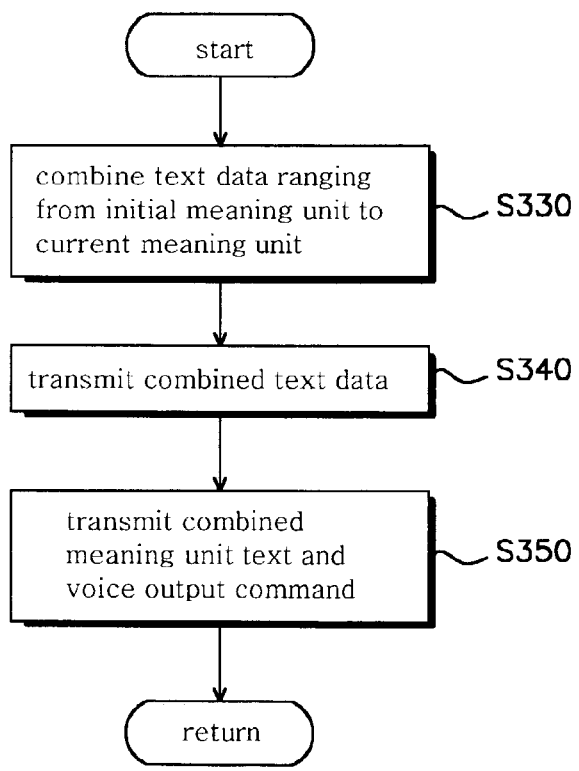
FIG. 8 is a flowchart showing an example in which the step of outputting the sentence in meaning units shown in FIG. 6 is performed in a cumulative and repetitive learning manner.

FIG. 8 is a flowchart showing an example in which the step of outputting the sentence in meaning units shown in FIG. 6 is performed in a cumulative and repetitive learning manner.

As illustrated in this drawing, in the cumulative and repetitive learning manner, the transmission control unit 130 or 320 combines text data corresponding to meaning units ranging from an initial meaning unit to a current meaning unit at step S330. Thereafter, the transmission control unit 130 or 320 transmits the combined text data at step S340, and transmits a combined meaning unit text and voice output command at step S350. Accordingly, whenever the pointer of a current meaning unit is increased by one, a subscriber receives a meaning unit text data in which one more meaning unit is accumulated and combined with the previous meaning units.

Figure 9A:
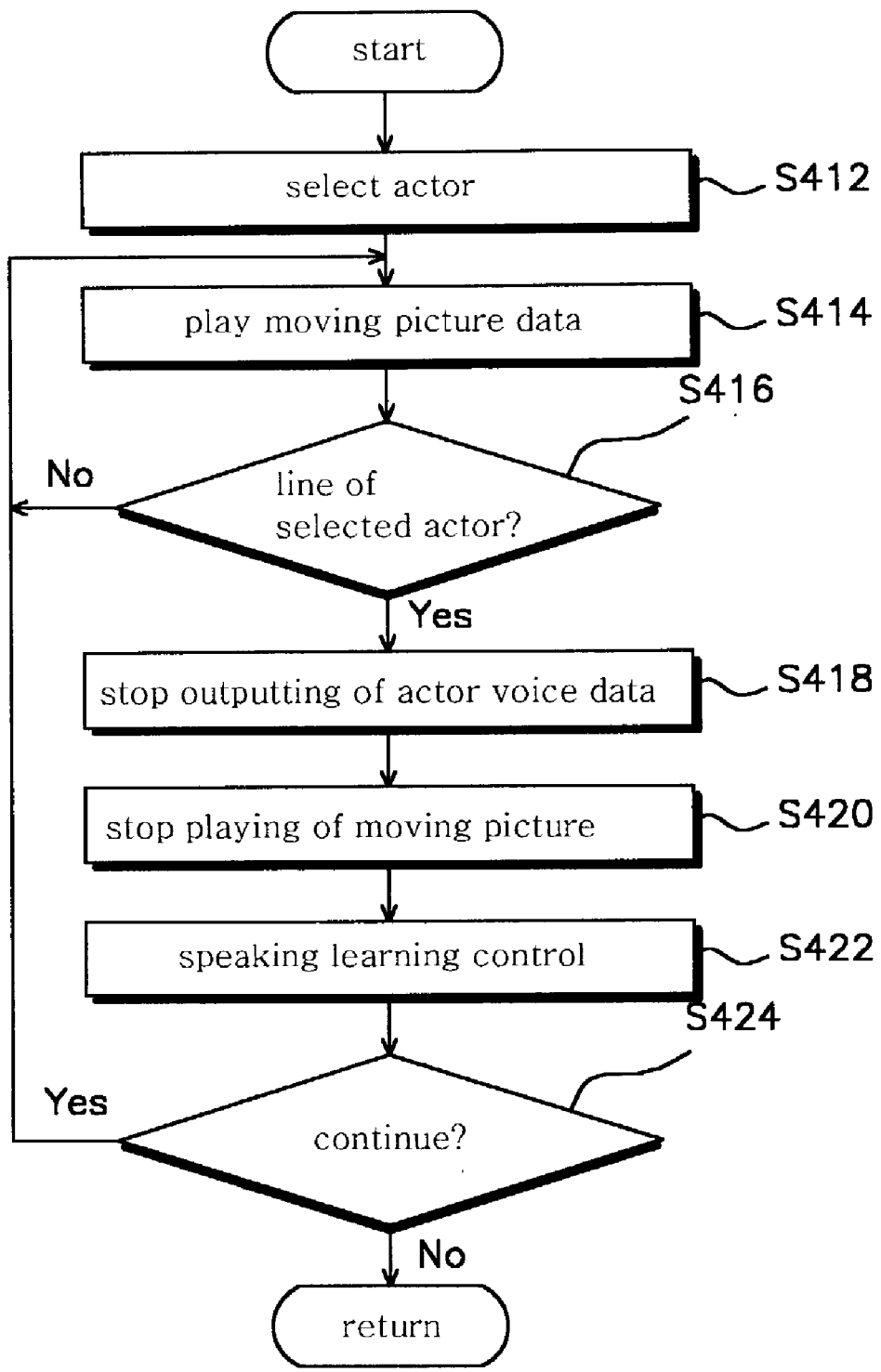
FIGS. 9A to 9G are flowcharts showing a role-play learning control step of FIG. 6 in detail.

FIG. 9A is a flowchart showing the role-play learning control step of FIG. 6 in detail. When the speaking learning mode starts, the output control unit 450 causes a learner to select an actor of a moving picture to play at step S412. In this case, information on the actor whom the learner has selected corresponds to the actor code shown in FIG. 5B. The role of the learner may be changed in the process of learning.

If the learner has selected the actor, the output control unit 450 extracts moving picture data from the moving picture data buffer 434 and plays the extracted moving picture data via the video card 460 and the sound card 474 at step S414.

In this case, a line of the selected actor of the moving picture corresponds to a caption code shown in FIG. 5B, and is output in the form of a text via the video card 460. The output text is output as a single sentence with first to n-th meaning unit text combined together.

In the process of learning, the output control unit 250 determines whether a line of an actor to be output is a line of the actor whom the learner has selected at step S416. If the line of the actor to be output is the line of the actor whom the learner has selected, the voice data of a moving picture data are stopped from being output via the sound card and the moving picture is temporarily stopped from being played at steps S418 to S420.

Subsequently, the output control unit starts the speaking learning control to allow the learner to learn speaking learning using the lines of the selected actor at step S422. In the embodiment of the present invention, the speaking learning control is described with six examples (refer to FIGS. 9B to 9G). When the speaking learning control ends, the output control unit 250 continues the role-play learning (the speaking learning) or ends the role-play learning at step S424.

Figure 9B:
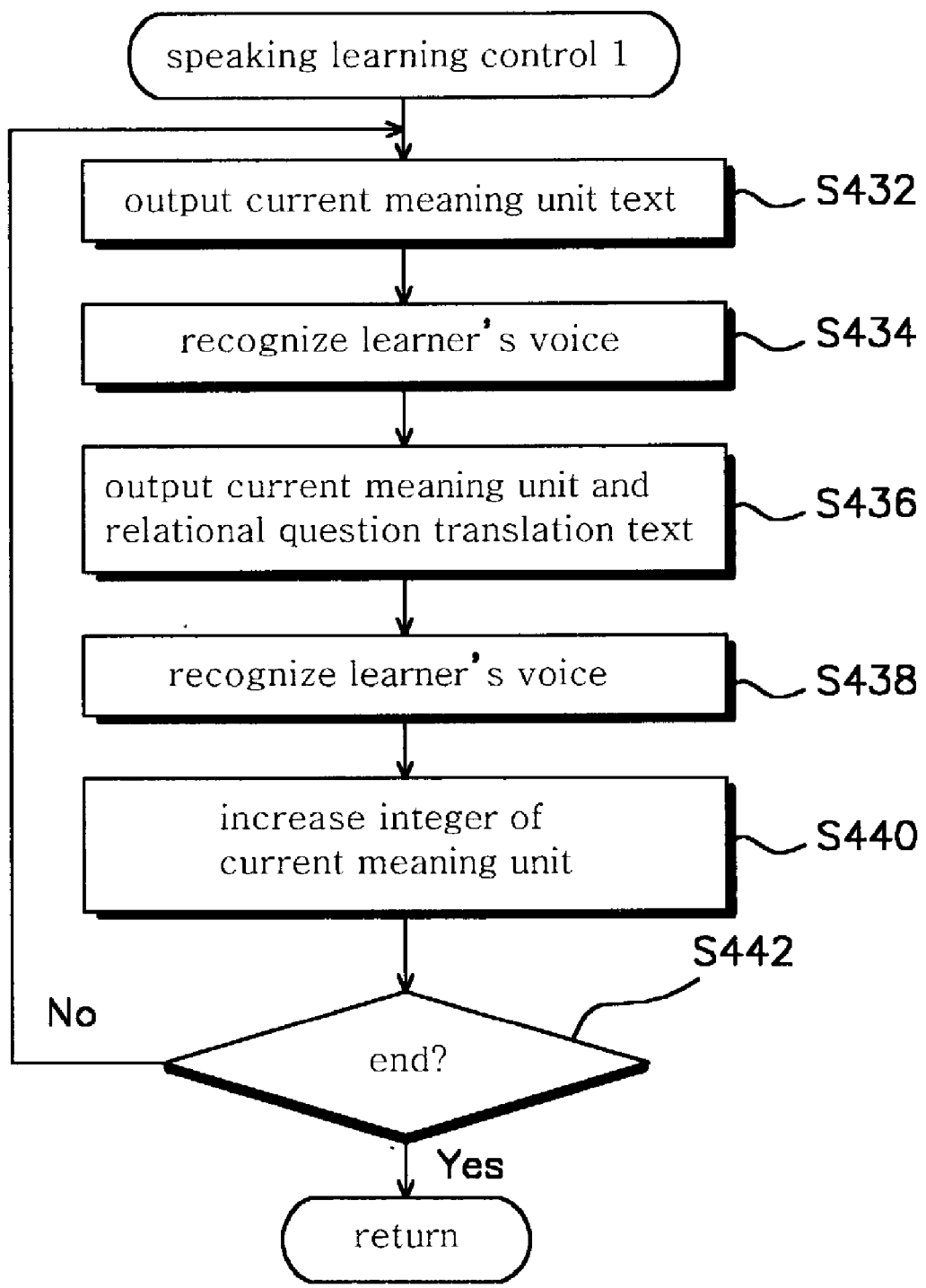

FIG. 9B is a flowchart showing an example (speaking learning control 1) of the speaking learning control step S422 of FIG. 9A. In this example, the learner may perform repeating learning that corresponds to an initial part of the speaking learning.

First, the output control unit outputs a current meaning unit text (for example, "I went") to the learner at step S432. The current meaning unit text is output in the form of a voice or text. The output control unit recognizes a voice of the learner at step S434, and determines whether the learner has correctly performed the repeating learning. In this case, if the voice of the learner is not correctly recognized, the learner is allowed to repeatedly input his voice (for example, three times).

Subsequently, the output control unit outputs the translated text of the output current meaning unit and a relational question (for example, "I went" and "where to" in the learner's native language") at step S436. The output control unit recognizes the voice of the learner at step S438, and determines whether the learner has correctly performed the repeating learning. As described above, the current meaning unit text, the translated text and the relational question are output.

When the translated text of the output current meaning unit and the relational question are output as described above, the output control unit increases the pointer of the current meaning unit at step S440, and causes the process to return to step S432. If all meaning units are output at the step of increasing the pointer of the current meaning unit, the output control unit causes the process to return.

Figure 9C:
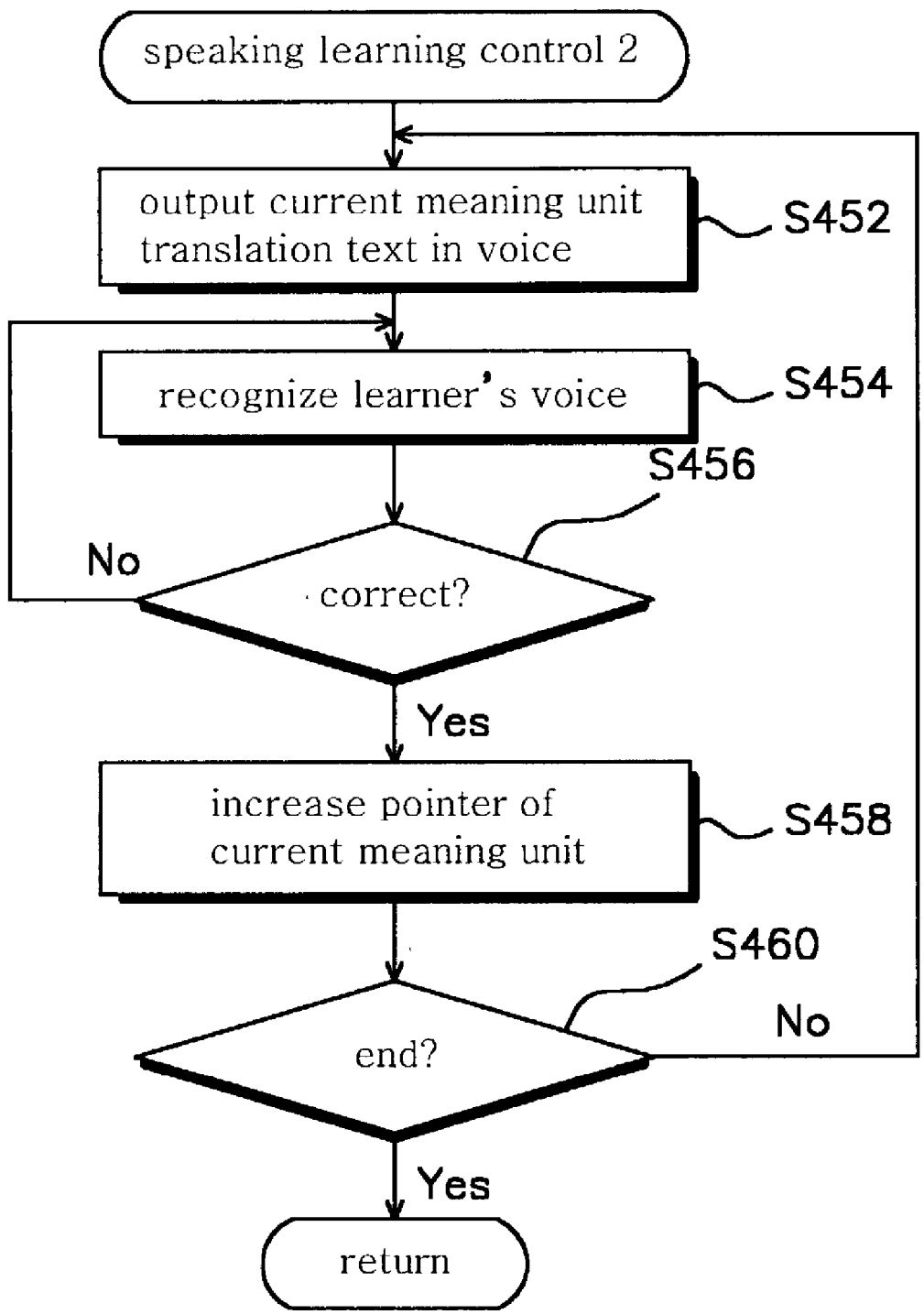

FIG. 9C is a flowchart showing another example (speaking learning control 2) of the speaking learning control step S422 of FIG. 9A. In this example, when the translated text of a meaning unit of a line of the selected actor is output in the form of a voice, the learner speaks the meaning unit corresponding to the output translated text. In this case, a relational question is not output to the learner.

For example, the output control unit outputs the translated text of a current meaning unit (for example, "I went" in the learner's native language) at step S452. The output control unit receives a voice from the learner and recognizes the voice at step S454, and determines whether the learner has correctly performed the repeating learning at step S456. At this time, the output control unit compares the result of the recognition with the current meaning unit (for example, "I went"). Accordingly, the learner can perform speaking learning in such a way as to give a foreign language response (meaning unit text) to a native language question (the translated text of the meaning unit).

Subsequently, the output control unit increases the pointer of the current meaning unit at step S458, and continues speaking learning using a meaning unit constituting part of the line of the selected actor.

Figure 9D:
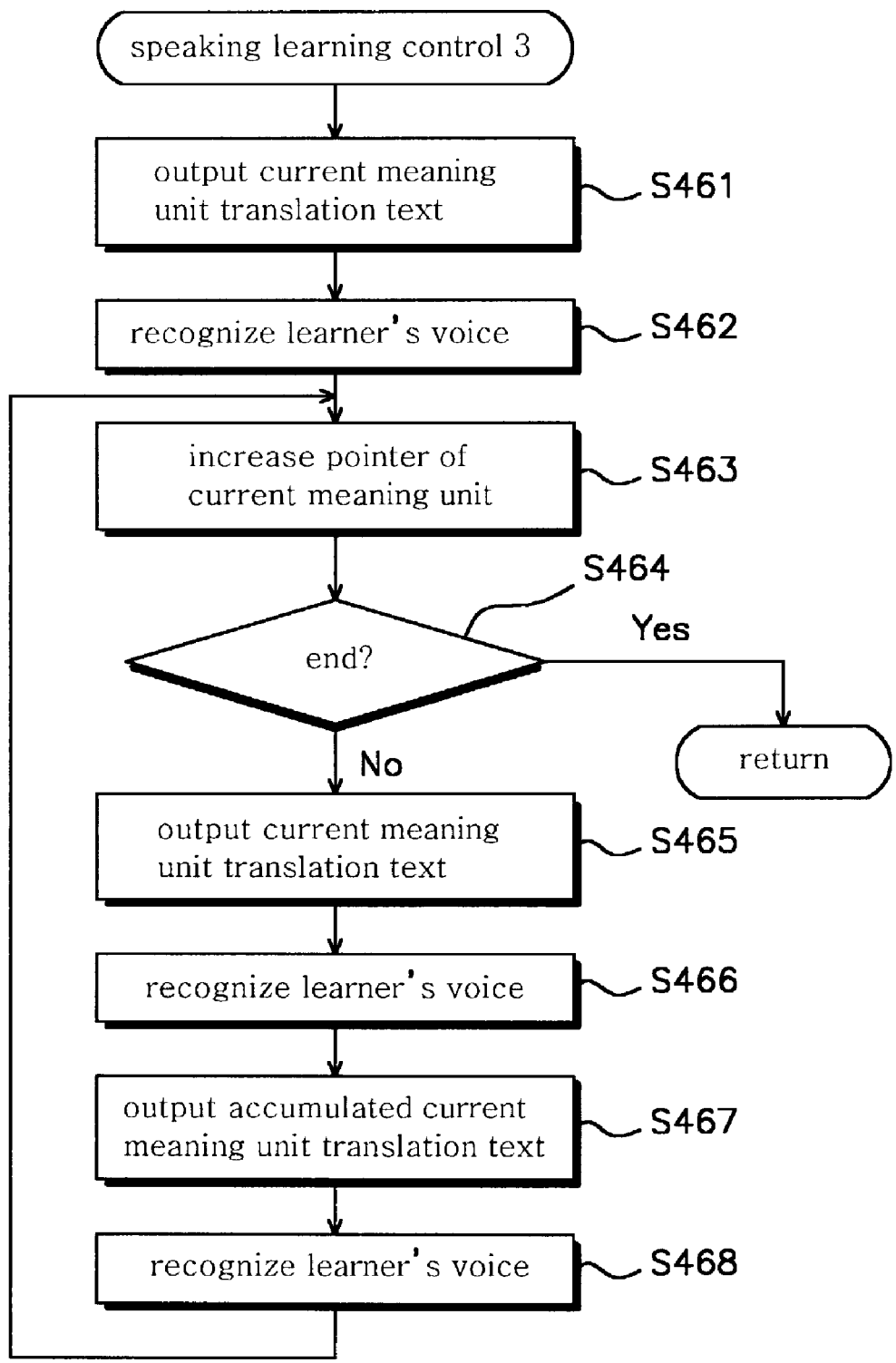

FIG. 9D is a flowchart showing still another example (speaking learning control 3) of the speaking learning control step S422 of FIG. 9A. In this example, the speaking learning of FIG. 9C is cumulatively and repeatedly performed.

First, the output control unit outputs the translated text of a current meaning unit ("I went" in the learner's native language) at step S461. Thereafter, the output control unit recognizes a voice of a learner at step S462. Thereafter, the output control unit compares the recognized voice of the learner with the current meaning unit text (for example, "I went").

Subsequently, the output control unit increases the pointer of the current meaning unit at step S463. If there are no more meaning units, the output control unit causes the process to return. If there is a current meaning unit, the output control unit outputs the translated text of the current meaning unit (for example, "to Kimpo airport" in the learner's native language) at step S465. Then, the output control unit recognizes a voice of the learner at step S466. Thereafter, the output control unit compares the recognized voice of the learner with the current meaning unit text (for example, "to Kimpo airport").

Subsequently, the output control unit outputs an accumulation of the translated text of the meaning units that have been output up to the present at step S467. Then, the output control unit recognizes the voice of the learner at step S468. Thereafter, the output control unit compares the recognized voice of the learner with the accumulation of the current meaning unit text (for example, "I went to Kimpo airport"). After performing the step S468 of recognizing the voice of the learner, the output control unit causes the process to return to the step S463.

Figure 9E:
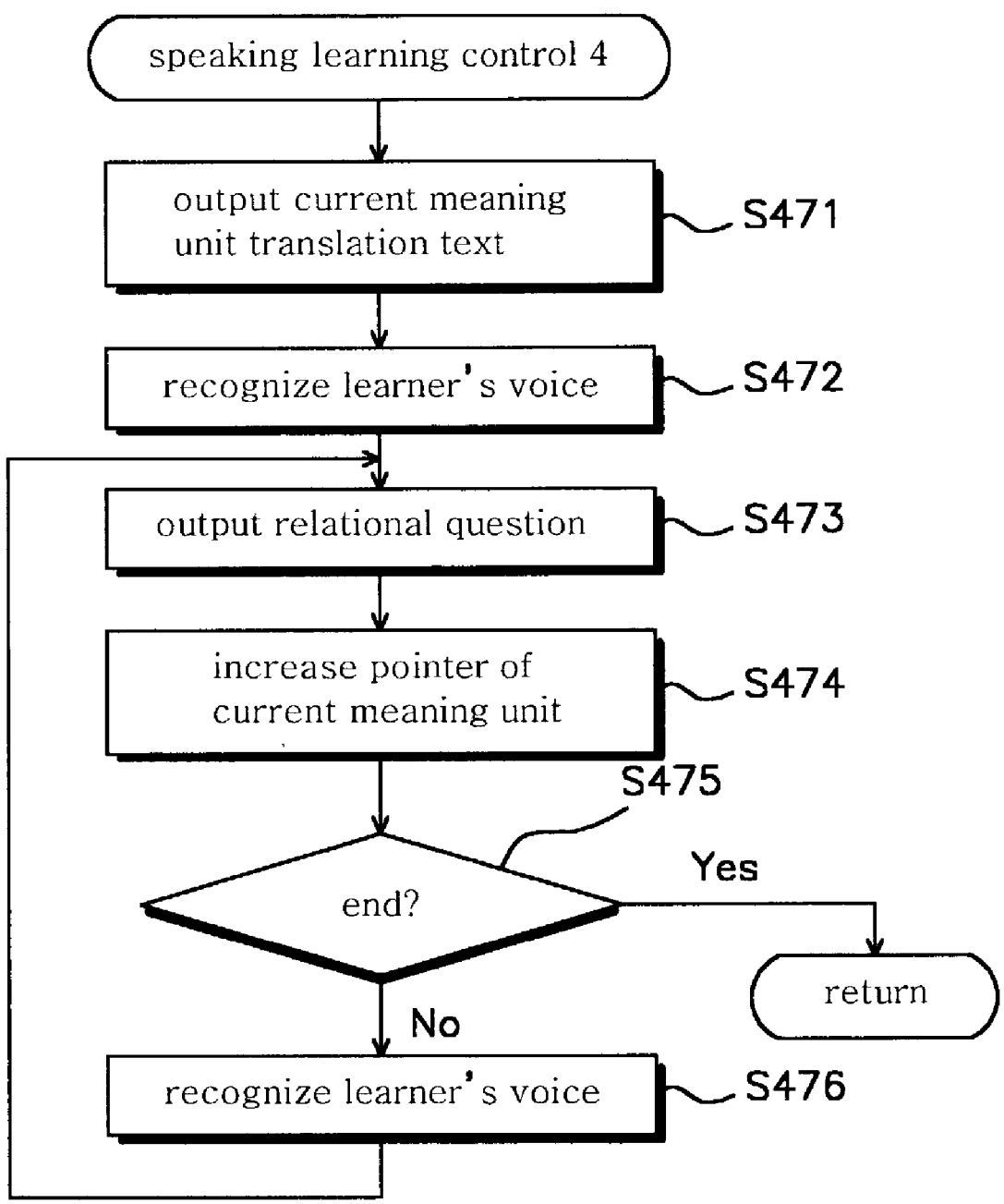

FIG. 9E is a flowchart showing still another example (speaking learning control 4) of the speaking learning control step S422 of FIG. 9A. In this example, the speaking learning of FIG. 9C is cumulatively and repeatedly performed.

First, the output control unit outputs the translated text of a current meaning unit (for example, "I went" in the learner's native language) at step S471. Then, the output control unit recognizes a voice of the learner at step S472. Thereafter, the output control unit compares the recognized voice of the learner with the current meaning unit text (for example, "I went"). Subsequently, the output control unit outputs a relational question (for example, "where to" in the learner's native language at step S473.

When the relational question is output, the output control unit increases the pointer of the current meaning unit at step S474, and determines whether the output of all meaning units has ended at step S475. If the output of all the meaning units has ended, the output control unit causes the process to return. If the output of all the meaning units has not ended, the output control unit recognizes another voice of the learner at step S476. Then, the output control unit compares the recognized voice of the learner with the current meaning unit text (for example, "to Kimpo airport"). Thereafter, the output control unit causes the process to return to step S473.

Figure 9F:
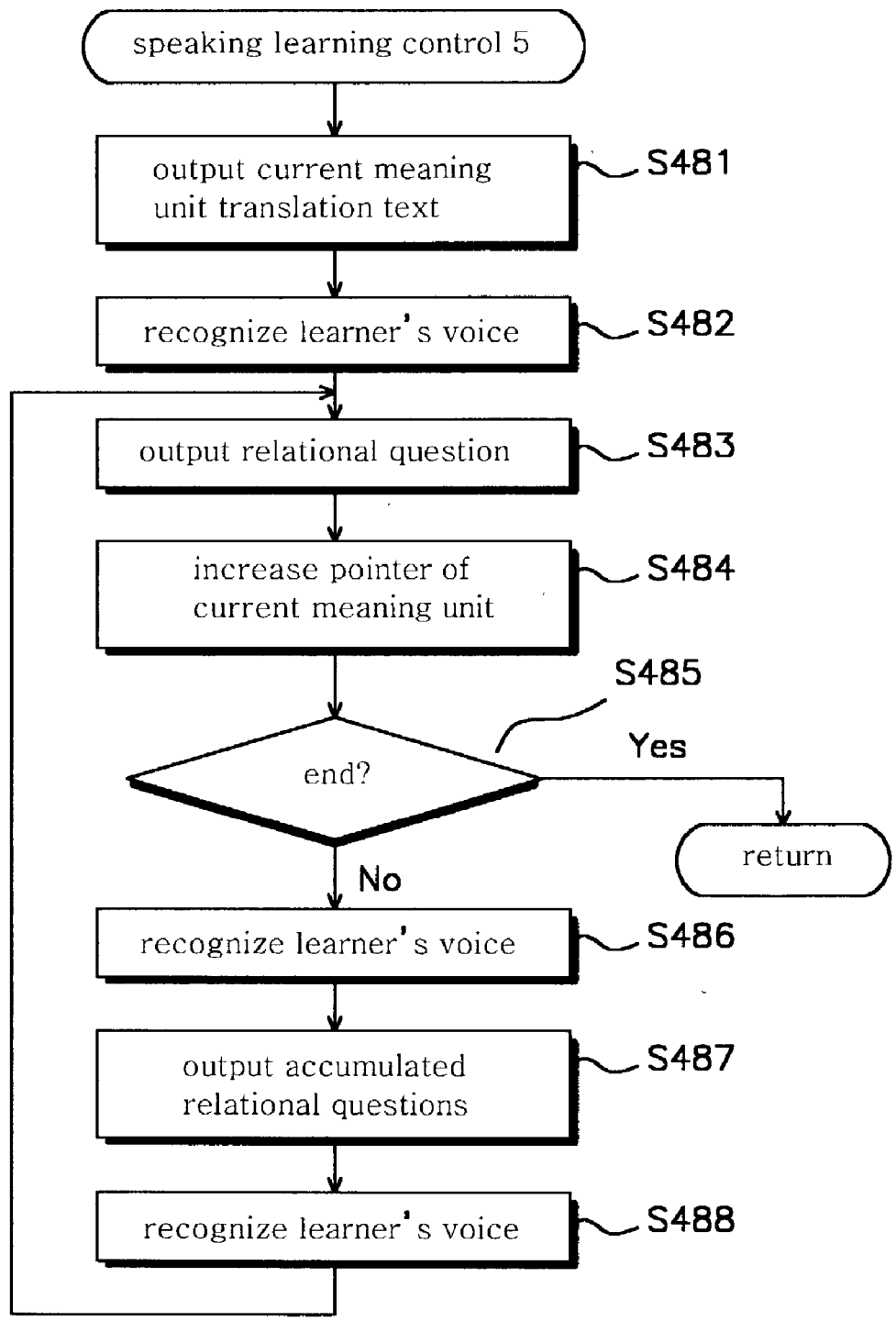

FIG. 9F is a flowchart showing still another example (speaking learning control 5) of the speaking learning control step S422 of FIG. 9A. In this example, the output of the relational questions of the speaking learning of FIG. 9E is cumulatively and repeatedly performed.

First, the output control unit outputs the translated text of a current meaning unit ("I went" in the learner's native language) at step S481. Then, the output control unit recognizes a voice of a learner at step S482. Thereafter, the output control unit compares the recognized voice of the learner with the current meaning unit text (for example, "I went"). Subsequently, the output control unit outputs a relational question (for example, "where to" in the learner's native language) with respect to the current meaning unit at step S483.

When the relational question is output, the output control unit increases the pointer of the current meaning unit at step S484, and determines whether the output of all meaning units has ended at step S485. If the output of all the meaning units has ended, the output control unit causes the process to return. If the output of all the meaning units has not ended, the output control unit recognizes the voice of the learner at step S486. Then, the output control unit compares the recognized voice of the learner with the current meaning unit text (for example, "to Kimpo airport").

Subsequently, the output control unit outputs accumulated relational question text (for example, "I went" and "where to" in the learner's native language") at step S487. Then, the output control unit recognizes the voice of the learner at step S488. Thereafter, the output control unit compares the recognized voice of the learner with the current meaning unit text (for example, "I went to Kimpo airport"). Subsequently, the output control unit causes the process to return to the step S483.

Figure 9G:
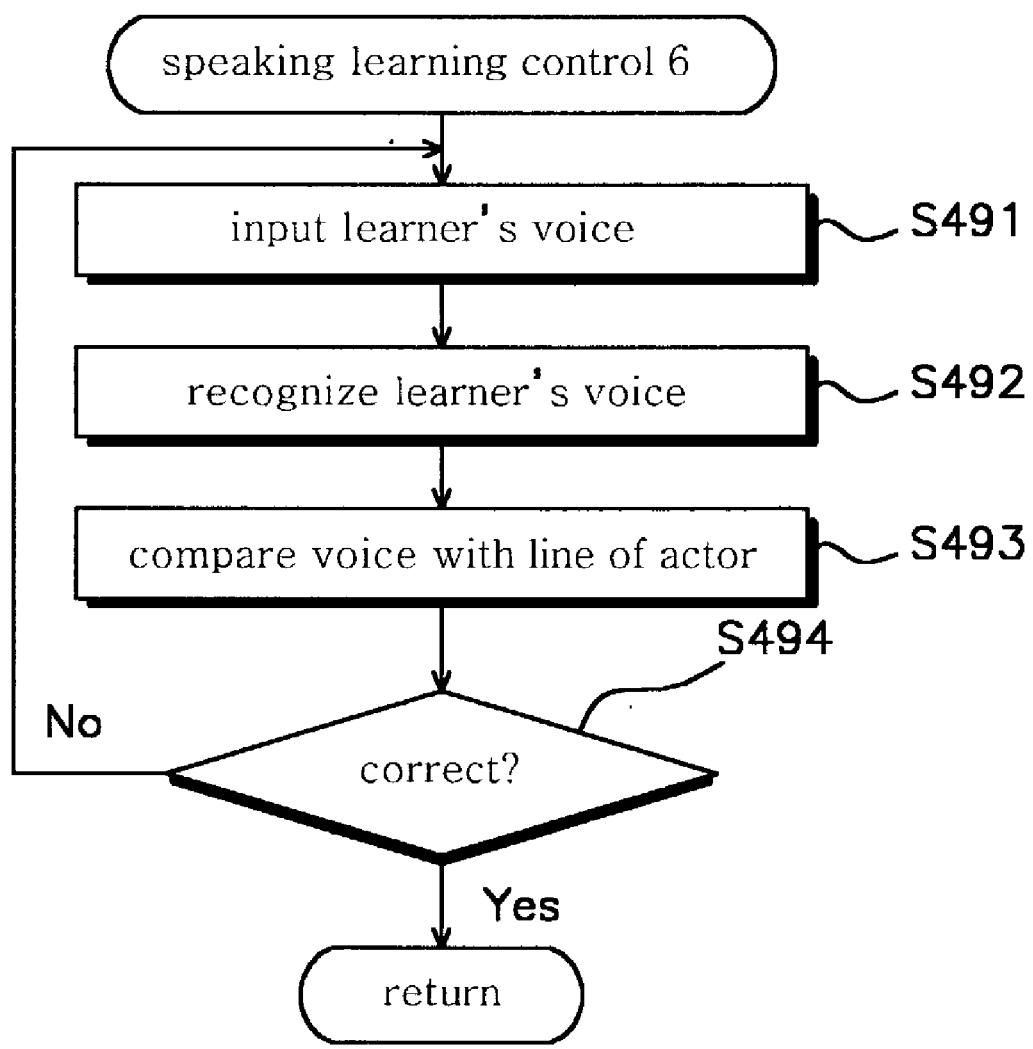

FIG. 9G is a flowchart showing still another example (speaking learning control 6) of the speaking learning control step S422 of FIG. 9A. In this example, a voice of a learner is input, and it is determined whether the input voice corresponds to a line of a selected actor. That is, the learner should input the line of the selected actor in the form of a voice.

The output control unit receives a voice of a line of a selected actor from the learner at step S491, recognizes the voice at step S492, and compares the recognized voice with the line of the selected actor at step S493. This comparison is performed by comparing the recognized voice of the learner with a combined text obtained by combining all the meaning units constituting a line of the selected actor.

If the recognized voice coincides with the combined text, the output control unit allows the process to return to continue the role-play learning. In contrast, if the recognized voice does not coincide with the combined text, the output control unit causes the process to return to the step S491 of receiving a voice from the learner.

Figure 10:
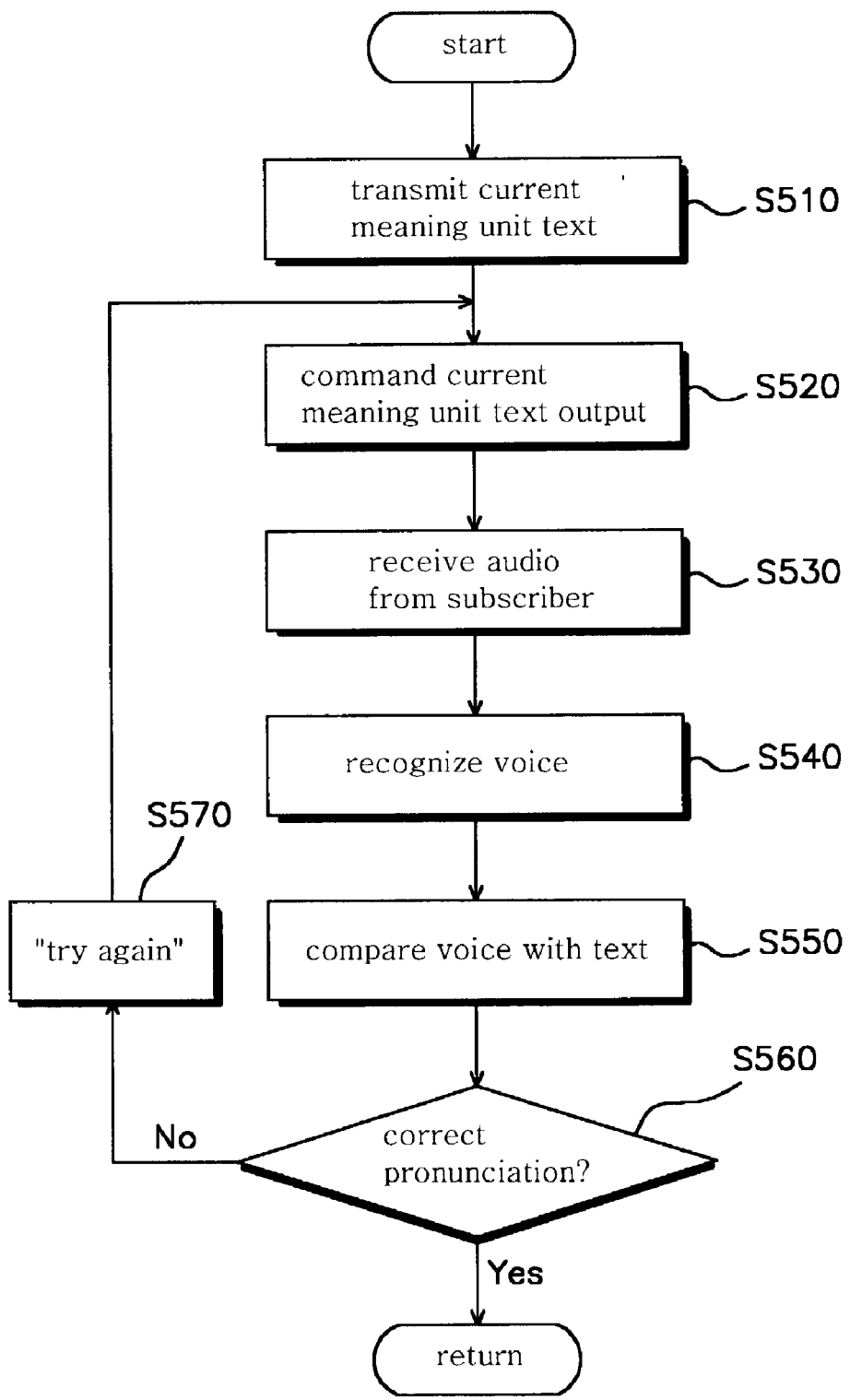
FIG. 10 is a flowchart showing an example in which the reading learning control step of FIG. 6 is performed in a basic learning manner in detail.

FIG. 10 is a flowchart showing an example in which the reading learning control step of FIG. 6 is performed in a basic learning manner in detail.

As illustrated in this drawing, when speaking learning in accordance with the basic learning manner starts, the transmission control unit 130 or 320 outputs the text data of a current meaning unit at step S510.

Subsequently, the transmission control unit 130 or 320 transmits a command to output the data of the current meaning unit in the form of a text at step S520 and receives audio data from a subscriber at step S530. The audio data from the subscriber contain information on the pronunciation of the subscriber.

Then, the transmission control unit speech-recognizes the audio data of the output current meaning unit and the audio data received from the subscriber at step S540, compares the recognized audio data with the current meaning unit data at step S550, and determines whether the pronunciation of the subscriber is correct at step S560. That is, the received audio data are recognized by features extracted from the received audio data. If the speech recognition is correctly performed, the pronunciation of the subscriber is determined to be correct; while if the speech recognition is incorrectly performed, the pronunciation is determined to be incorrect.

If the audio data from the subscriber is determined to be incorrect, the transmission control unit outputs a voice message, for example, "try again", at step S570, and causes the process to return to step S520.

Figure 11:
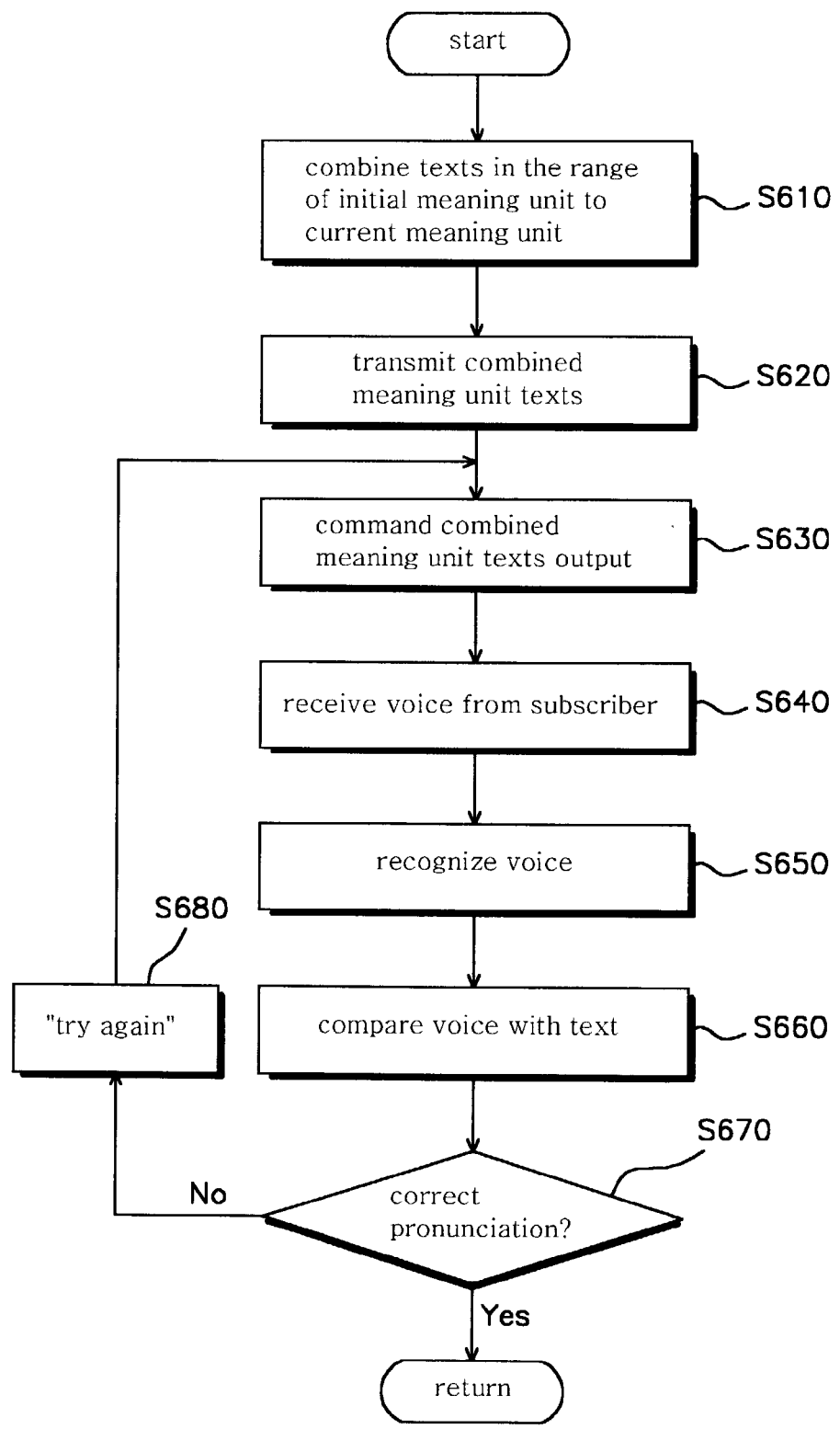
FIG. 11 is a flowchart showing an example in which the reading learning control step of FIG. 6 is performed in a cumulative and repeated learning manner in detail.

FIG. 11 is a flowchart showing an example in which the reading learning control step of FIG. 6 is performed in a cumulative and repeated learning manner in detail.

As illustrated in this drawing, when speaking learning in accordance with the cumulative and repeated learning manner starts, the transmission control unit 130 or 320 combines text data corresponding to meaning units ranging from an initial meaning unit to a current meaning unit at step S610.

The transmission control unit transmits the combined meaning unit text data at step S620, and issues a command to output the combined meaning unit text in the form of a text at step S630. Furthermore, the transmission control unit receives audio data from the subscriber at step S640. The audio data from the subscriber contain information on the pronunciation of the subscriber.

Thereafter, the transmission control unit speech-recognizes audio data received from the subscriber at step S650, compares the recognized audio data with the combined meaning unit text at step S660, and determines whether the pronunciation of the subscriber is correct at step S670. That is, the received audio data are recognized by features extracted from the received audio data. If the speech recognition is correctly performed, the pronunciation of the subscriber is determined to be correct; while if the speech recognition is incorrectly performed, the pronunciation is determined to be incorrect.

If the pronunciation is determined to be incorrect, the transmission control unit outputs a voice message, for example, "try again", at step S680, and causes the process to return to the step S630 of outputting the combined meaning unit text.

Although in the embodiment shown in FIG. 11 the speaking learning has been described as being performed by causing the learner to repeat the voice of the meaning unit, the reading learning could be performed in such a way as to output meaning unit text instead of the voice of the meaning unit and cause the learner to read the meaning unit text. When this reading learning is performed, texts are combined together at step S610 and the combined meaning unit text is transmitted at step S620.

Thereafter, the transmission control unit does not perform step S630 to prevent the voice of the meaning unit from being output, but receives audio data from the subscriber at step S640. When the audio data are received from the subscriber as described above, the transmission control unit speech-recognizes the audio data at step S650, compares the recognized audio data with the transmitted meaning unit text at step S660, and determines whether the reading of the subscriber is correct at step S670.

Figure 12:
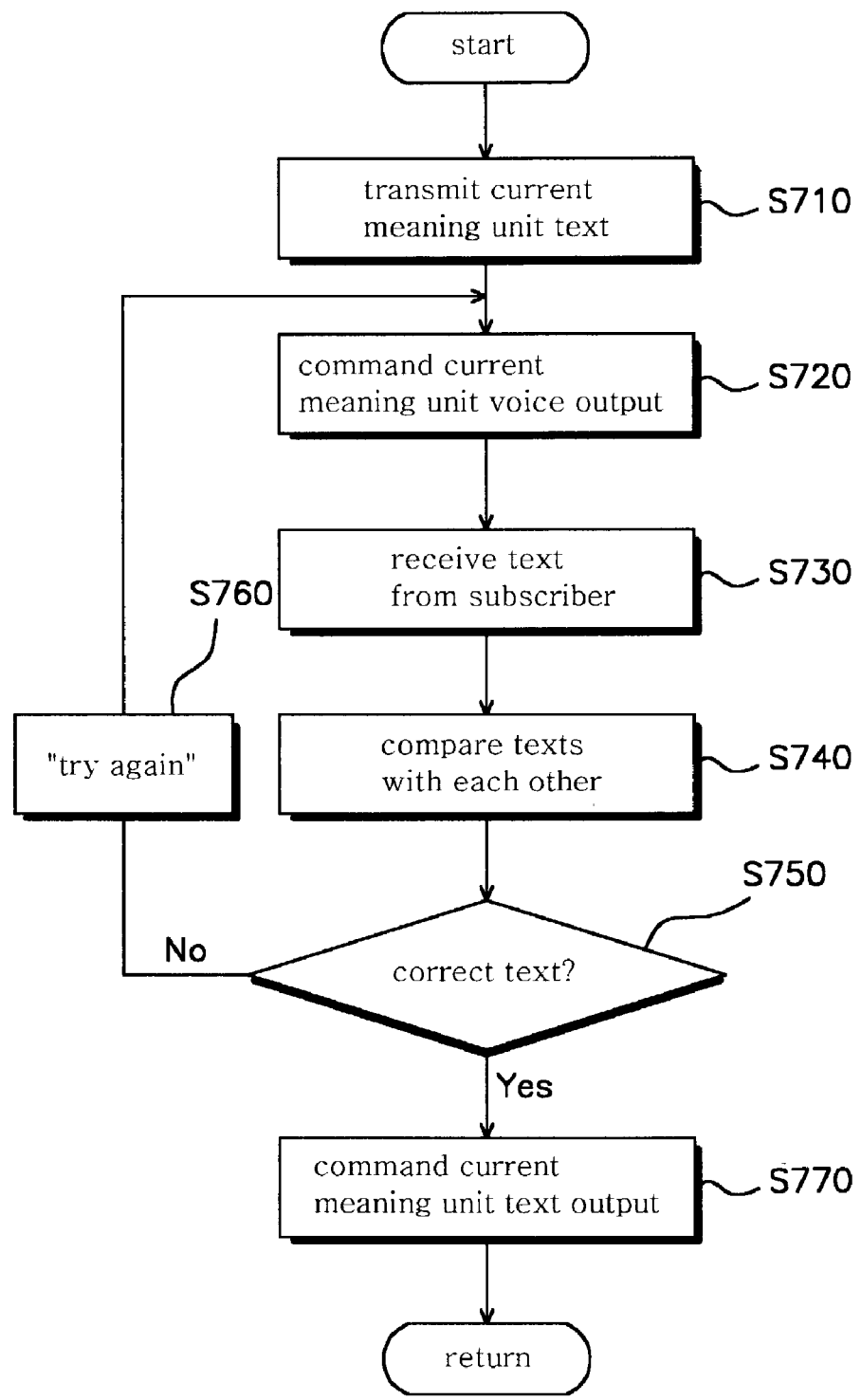
FIG. 12 is a flowchart showing an example in which a dictation learning control step of FIG. 6 is performed in a basic learning manner in detail.

FIG. 12 is a flowchart showing an example in which a dictation learning control step of FIG. 6 is performed in a basic learning manner in detail.

As illustrated in this drawing, when the dictation learning in accordance with the basic learning manner starts, the transmission control unit transmits the text data of a current meaning unit at step S710 and issues a command to output the current meaning unit in the form of a voice at step S720.

Thereafter, the transmission control unit receives text data from a subscriber at step S730 and compares the text data received from the subscriber with the text data of the current meaning unit at step S740. In this case, if the two text data coincide, it is determined that the dictation of the subscriber is correct; if the two text data do not coincide, it is determined that the dictation of the subscriber is incorrect at step S750.

If it is determined that the dictation is incorrect, the transmission control unit outputs a voice message, for example, "try again", at step S760, and then allows the process to return to the step S720 of issuing a command to output the current meaning unit in the form of a voice.

If it is determined that the dictation is correct, the transmission control unit issues a command to output the current meaning unit in the form of a text so as to allow the subscriber to confirm the text of the current meaning unit at step S770.

Figure 13:
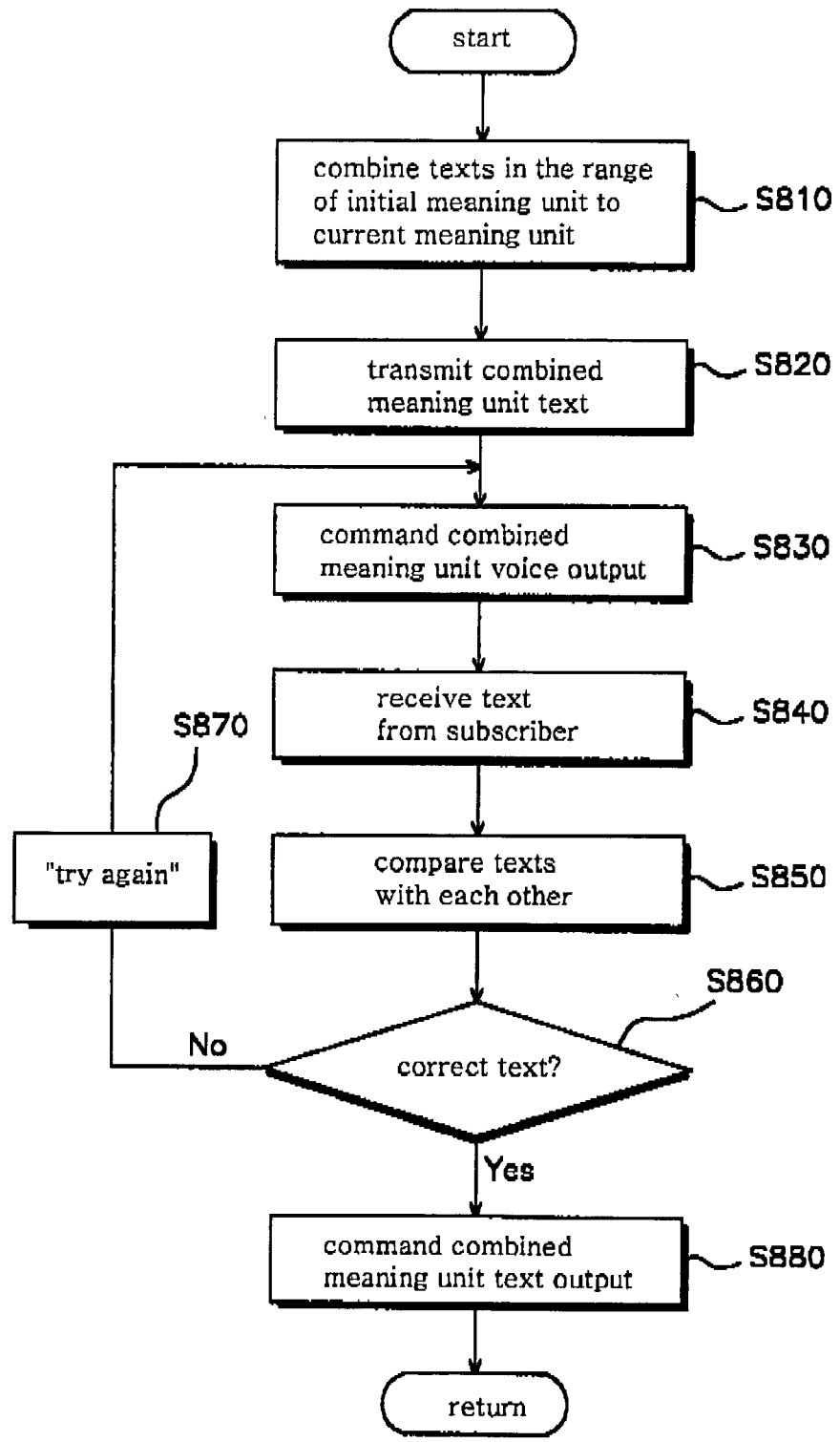
FIG. 13 is a flowchart showing an example in which the dictation learning control step of FIG. 6 is performed in a cumulative and repeated learning manner in-detail.

FIG. 13 is a flowchart showing an example in which the dictation learning step of FIG. 6 is performed in a cumulative and repeated learning manner in detail.

As illustrated in this drawing, when dictation learning in accordance with the cumulative and repeated learning manner starts, the transmission control unit combines texts corresponding to meaning units ranging from an initial meaning unit to a current meaning unit at step S810.

Subsequently, the transmission control unit transmits the combined meaning unit text data at step S820, issues a command to output the combined meaning unit text data in the form of a voice at step S830, and receives text data from a subscriber at step S840. Thereafter, the transmission control unit compares the text data received from the subscriber with the combined meaning unit text data at step S850, and determines whether the dictation of the subscriber is correct at step S860. In detail, if the two text data coincide, it is determined that the dictation of the subscriber is correct; if the two text data do not coincide, it is determined that the dictation of the subscriber is incorrect.

If it is determined that the dictation is incorrect, the transmission control unit outputs a voice message, for example, "try again", at step S870, and allows the process to return to the step S830 of issuing a command to output the combined meaning units in the form of a voice.

If it is determined that the dictation is correct, the transmission control unit issues a command to output the combined meaning units in the form of a text so as to allow the subscriber to confirm the combined meaning unit text at step S880.

Although in the above-described embodiments the present invention has been described as being applied to English language learning, the present invention can be applied to any language whose sentences can be divided into meaning units. Additionally, although in the above-described embodiments the present invention has been described as being constructed in such a way that a subscriber is asked a relational question, audio or text data are received from the subscriber and it is determined whether the answer of the subscriber is correct, the present invention could be constructed in such a way that the subscriber is provided with a plurality of pictures or texts, the subscriber is made to select one, and it is determined whether the answer of the subscriber is correct. That is, in this case, after a plurality of meaning units appropriate for a single relational question and a plurality of meaning units inappropriate for the relational question are provided to a subscriber in picture or text, it is determined whether one that the subscriber has selected is included in the appropriate meaning units. In this case, the pictures are used while being related to the texts.

Although learning materials have been described as being transmitted between the information provider apparatus and the subscriber apparatus via the Internet in real time as an example, learning materials selected by a learner could be transmitted to a terminal of the learner in a lump, and utilized in the terminal of the subscriber (subscriber apparatus). Alternatively, the learning materials of a learning material DB provided by the information provider apparatus are stored in a portable storage device, such as a CD, a DVD, a tape and the like, and provided to a learner (subscriber) to be utilized in a computer of the learner. In addition, although in the above-described embodiments the voice of a learner has been described as being recognized by the system and method so as to improve the effects of learning, a sentence may be output in the form of a voice on the basis of a meaning unit and a relational question in the case where there is no voice recognition engine. Therefore, the language education system according to the embodiment of the present invention enables language education both on-line and off-line.

As described above, the present invention provides a system and method for language education, which can effectively provide listening, speaking, reading and writing educations according to the levels of the learners via the Internet. Additionally, the present invention can provide a meaning unit and a relational question to change a sentence according to a situation. Furthermore, the present invention allows learners to naturally learn the word orders of sentences and to improving their abilities to generate and predict sentences. Additionally, the present invention enables language education using multimedia learning materials both on-line and off-line.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for language education using meaning units and relational questions, wherein data are extracted from a storage medium storing multimedia moving picture learning materials and are outputted to subscriber terminals in accordance with a procedure of a language learning program, comprising the steps of:

storing each line of the multimedia moving picture learning materials according to word order and the relational questions in the storage medium, wherein each line is divided into a plurality of meaning units which are a collection of words that form a meaning constitution of the line and the relational question induces the subscriber to respond using a corresponding meaning unit;

extracting a multimedia moving picture learning material, a relational question, and a meaning unit from the storage medium and receiving an item of a learning menu selected by the subscriber; and playing the extracted multimedia moving picture learning material in accordance with the selected item of the learning menu and facilitating learning on a basis of the meaning unit and the relational question.

2. The method according to claim 1, wherein the step of receiving the menu item comprises the step of receiving information on whether to choose to view the played multimedia moving picture learning material or not.

3. The method according to claim 2, wherein the step of facilitating learning comprises the step of sequentially outputting a line of the played multimedia moving picture learning material in meaning units if the viewing of the played multimedia moving picture learning material is chosen.

4. The method according to claim 1, wherein the step of receiving the menu item comprises the step of receiving information on whether to choose to facilitate listening learning on a basis of a meaning unit corresponding to the played multimedia moving picture learning material or not.

5. The method according to claim 4, wherein the step of facilitating learning comprises the step of outputting lines of the played multimedia moving picture learning material in meaning units in sequence and sequentially outputting relational questions corresponding to the meaning units if the facilitating of the listening learning is chosen.

6. The method according to claim 1, wherein the step of receiving the menu item comprises the step of receiving information on whether to choose to facilitate role-play learning on a basis of lines of an actor corresponding to the played multimedia moving picture learning material or not.

7. The method according to claim 6, wherein the step of facilitating learning comprises the steps of:
   the learner selecting an actor if the facilitating of the role-play learning is chosen;
   playing the multimedia moving picture learning material, and stopping the outputting of a voice of the multimedia moving picture learning material and temporarily stopping the playing of the multimedia moving picture learning material when a line of the actor whom the learner has selected is outputted; and
   sequentially outputting a translated text of the current meaning unit and a relational question while increasing a pointer of the current meaning unit of the line, recognizing a voice of the learner and determining whether pronunciation of the learner is correct.

8. The method according to claim 6, wherein the step of facilitating learning comprises the steps of:
   the learner selecting an actor if the facilitating of the role-play learning is chosen;
   playing the multimedia moving picture learning material, and stopping the outputting of the voice of the multimedia moving picture learning material and temporarily stopping the playing of the multimedia moving picture learning material when a line of the actor whom the learner has selected is outputted; and
   sequentially outputting a voice of a translated text of a current meaning unit while increasing a pointer of the current meaning unit of the line, recognizing a voice of the learner and determining whether pronunciation of the learner is correct by comparing the recognized voice of the learner with the current meaning unit.

9. The method according to claim 6, wherein the step of facilitating learning comprises the steps of:
   the learner selecting an actor if the facilitating of the role-play learning is chosen;
   playing the multimedia moving picture learning material, and stopping the outputting of a voice of the multimedia moving picture learning material and temporarily stopping the playing of the multimedia moving picture learning material when a line of the actor whom the learner has selected is outputted; and
   sequentially outputting a voice of accumulated translation text of the meaning unit while increasing a pointer of a current meaning unit of the line, sequentially recognizing a voice of the learner and determining whether pronunciation of the learner is correct by comparing the recognized voice of the learner with the accumulated data of the current meaning unit.

10. The method according to claim 6, wherein the step of facilitating learning comprises the steps of:
    the learner selecting an actor if the facilitating of the role-play learning is chosen;
    playing the multimedia moving picture learning material, and stopping the outputting of a voice of the multimedia moving picture learning material and temporarily stopping the playing of the multimedia moving picture learning material when a line of the actor whom the learner has selected is outputted; and
    sequentially outputting a voice of a relational question of a current meaning unit while increasing a pointer of the current meaning unit of the line, recognizing a voice of the learner and determining whether pronunciation of the learner is correct by comparing the recognized voice of the learner with the current meaning unit.

11. The method according to claim 6, wherein the step of facilitating learning comprises the steps of:
    the learner selecting an actor if the facilitating of the role-play learning is chosen;
    playing the multimedia moving picture learning material, and stopping the outputting of a voice of the multimedia moving picture learning material and temporarily stopping the playing of the multimedia moving picture learning material when a line of the actor whom the learner has selected is outputted; and
    sequentially outputting a voice of accumulated relational questions of current meaning units while increasing a pointer of a current meaning unit of the line, sequentially recognizing a voice of the learner and determining whether pronunciation of the learner is correct by comparing the recognized voice of the learner with the accumulated data of the current meaning unit.

12. The method according to claim 1, wherein the step of receiving the menu item comprises the step of receiving information on whether to choose to facilitate reading learning on a basis of lines corresponding to the played multimedia moving picture learning material or not.

13. The method according to claim 12, wherein the step of facilitating learning comprises the steps of:
    outputting a line of the played multimedia moving picture learning material in meaning units if the facilitating of reading learning is chosen; and
    receiving a voice from a learner, and determining whether the voice of the learner coincides with the line output in meaning units.

14. The method according to claim 1, wherein the step of receiving the menu item comprises the step of receiving information on whether to choose to facilitate dictation learning on a basis of lines of an actor corresponding to the played multimedia moving picture learning material or not.

15. The method according to claim 14, wherein the step of facilitating learning comprises the steps of:
    outputting a voice of a line of the played multimedia moving picture learning material in the meaning units if the facilitating of dictation learning is chosen; and
    receiving a key input from a learner, and determining whether the key input of the learner coincides with the line outputted in the meaning units.

* * * * *